United States Patent Office 3,503,874
Patented Mar. 31, 1970

3,503,874
HYDROCARBON CONVERSION CATALYST
Edward Michalko, Chicago, Ill., assignor to Universal Oil Products Company, Des Plaines, Ill., a corporation of Delaware
No Drawing. Filed Nov. 3, 1967, Ser. No. 680,353
Int. Cl. C10g 11/02; B01j 11/40
U.S. Cl. 208—120                                      19 Claims

ABSTRACT OF THE DISCLOSURE

A catalyst composition, method of manufacture, and process for the ultilization of said cataylst. The catalyst is a crystalline aluminosilicate dispersed in an amorphous silica matrix. The catalyst is manufactured by adding the crystalline aluminosilicate dispersed in its mother liquor to a silica sol and effecting gelation. The product is slurried with a solution comprising ammonium ions and spray dried. The cataylst is particularly effective in the catalytic cracking of hydrocarbon charge stocks.

BACKGROUND OF THE INVENTION

For many years, heavy pertoleum hydrocarbon feed stocks boiling in excess of about 400° F. have been converted to lower boiling hydrocarbons in the motor fuel boiling range by heating them at a temperature in the 600–1100° F. range in contact with an amorphous silica-alumina catalyst. While other composites comprising silica, e.g., silica-zirconia silica-magnesia, etc., have been known to catalyze the cracking reaction, the silica-alumina composite has been by far the most midely accepted catalyst in the industry. More recently, improved catalysts have been prepared by the inclusion of a finely divided zeolite, or crystalline alumino-silicate, either naturally occurring or synthetically prepared, within the amorphous silica-alumina matrix. Prior inventors have prepared, tested and compared hydrocarbon conversion catalysts comprising a finely divided crystalline alumino-silicate distributed in an amorphous silica matrix on the one hand, and in an amorphous silica-alumina matrix on the other hand. The general conclusion has been that the amorphous silica-alumina matrix affords a superior cracking catalyst. This conclusion might well have been anticipated since silica per se is to all intents and purposes substantially inert as a cracking catalyst and certainly not competitive with the silica-alumina composite.

It has now been discovered that a crystalline aluminosilicate dispersed in an amorphous silica matrix in accordance with the method of this invention is in fact a superior cracking catalyst in many respects. That this is totally unexpected in the art is evidenced by the fact that in spite of the comparatively low cost of silica the industry has turned almost exclusively to silica-alumina. As will be apparent with reference to the examples appended to this specification, a cracking catalyst prepared in accordance with the method of this invention will effect a substantial hydrocarbon conversion equivalent to the more active of the commercial catalysts while exhibiting improved selectivity and lower coke yield.

SUMMARY OF THE INVENTION

In one of its broad aspects the present invention embodies a method of preparing a catalyst composite comprising a crystalline aluminosilicate dispersed in a silica matrix which comprises dispersing a crystalline alkali metal alumino-silicate-mother liquor mixture in an acidified alkali metal silicate solution having a pH in excess of about 2.5, controlling the pH while effecting said dispersing so as not to exceed about 4.5, the final pH being from about 3.5 to about 4.5, and effecting gelation, slurrying the resulting gelation product with a solution comprising ammonium ions sufficient to base-exchange at least about 0.1 equivalent of alkali metal ions associated with said crystalline alkali metal aluminosilicate, the concentration of the ammonium ion precursor being such as to preclude the formation of acidic by-products selected from the group consisting of strong mineral acids and acid salts thereof, separating and drying the resulting base exchanged product at an elevated temperature.

One of the more specific embodiments relates to a method of preparing a catalyst composite comprising a crystalline aluminosilicate dispersed in a silica matrix which comprises preparing a crystalline sodium aluminosilicate by crystallization of the same from an aqueous sodium aluminosilicate reaction mixture having a composition expressed in terms of oxide mole ratios in the following range:

$Na_2O/SiO_2$ _____ 0.3 to 0.7
$SiO_2/Al_2O_3$ _____ 6 to 20
$H_2O/Na_2O$ _____ 25 to 60 and dispersing the resulting crystalline sodium aluminosilicate-mother liquor mixture in an acidified sodium silicate solution having a pH in excess of about 2.5, controlling the pH while effecting the dispersion so as not to exceed about 4.5, the final pH being from about 3.5 to about 4.5, and effecting gelation, adjusting the pH of the resulting reaction mixture to a pH of from about 6 to about 7 and aging the slurry for a period of from about 0.5 to about 1.5 hours, separating and re-slurrying the aged material with an ammonium sulfate solution comprising ammonium ions sufficient to base-exchange from about 0.3 to about 0.9 equivalent of sodium cations associated with said crystalline aluminosilicate, spray-drying the resulting slurry at an inlet temperature of from about 650° F. to about 1100° F. whereby a rapid evaporation of moisture is effected and dried particles fall out of the spray, treating said particles in contact with a solution comprising ammonium ions whereby the total sodium content is reduced to less than about 0.2 weight percent thereof, and base-exchanging the particles in contact with a solution comprising rare earth metal cations whereby the final catalyst composite comprises aluminum and rare earth metals in a ratio of from about 3:1 to about 6:1.

Pursuant to the present method of catalyst preparation, the crystalline aluminosilicate is prepared and utilized dispersed in its mother liquor. The crystalline aluminosilicate-mother liquor mixture herein contemplated may be prepared in any conventional or otherwise convenient manner. One preferred method comprises forming an aqueous solution of an alkali metal aluminate and an alkali metal hydroxide and commingling the same with an aqueous silica slurry. The alkali metal hydroxide is usually sodium hydroxide and the alkali metal aluminate is usually sodium aluminate, a sodium aluminate comprising $Na_2O/Al_2O_3$ molar ratio of about 1.2 being suitably employed. The resulting reaction mixture preferably comprises a $Na_2O/SiO_2$ molar ratio of at least about 0.3 and generally not in excess of about 0.7 and a $SiO_2/Al_2O_3$ molar ratio of from about 6 to about 20 and sufficient to yield a crystalline aluminosilicate product characterized by a $SiO_2/Al_2O_3$ molar ratio of at least about 3. Preferably, the reaction mixture is a composition expressed in terms of oxide mole ratios.

$SiO_2Al_2O_3$ _____ 6 to 20
$Na_2O/SiO_2$ _____ 0.3 to 0.7
$H_2O/Na_2O$ _____ 25 to 60

In any case, the crystalline aluminosilicate is precipitated from the reaction mixture at a temperature of from about 65° F. to about 245° F. utilizing a closed vessel to obviate water loss. It is preferable to age the reaction mixture for from about 1 to about 25 hours or more at a temperature up to about 100° F. prior to heating at a higher temperature—usually about 212° F. After the "cold age," the reaction mixture is heated as aforesaid to effect substantially complete precipitation of the crystalline aluminosilicate from its mother liquor.

The crystalline aluminosilicate-mother liquor mixture is thereafter cooled and added to the acidic sodium silicate solution in an amount to insure a final catalyst composite comprising from about 1.0 to about 60 weight percent crystalline aluminosilicate dispersed in an amorphous silica matrix, preferably from about 2.5 to about 20.0 weight percent. The crystalline aluminosilicate-mother liquor mixture is highly alkaline. It is preferred to add the mixture to an acidic sodium silicate solution having a pH in the lower range, say from about 2.5 to about 3.5, such that the final pH of the resulting mixture is in the aforesaid range of from about 4.0 to about 4.5. The addition is preferably accomplished as rapidly as possible to avoid undue exposure of the crystalline aluminosilicate to the more acidic conditions. The rate of addition is limited only by the efficiency with which the crystalline aluminosilicate-mother liquor is dispersed in the acidic sodium silicate solution. Should the alkaline mixture be added too rapidly with inadequate mixing, localized concentrations may occur in the reaction mixture in excess of the desired pH range. This has an adverse effect on the homogeneity of the reaction mixture and ultimately on the uniformity of the final catalyst composite. By an alternative and preferred method, the acidic sodium silicate may be prepared with an initial pH, say from 3.5 to about 4.5, and the pH controlled so as not to exceed about 4.5 by adding a suitable acid separately but concurrently with the alkaline crystalline aluminosilicate-mother liquor mixture.

The acidified alkali metal silicate hereinabove referred to is available by conventional methods of preparation. The alkali metal silicate most often employed is an aqueous sodium silicate solution commercially availabale as "water glass." Acidification with a proper amount of acid such as hydrochloric acid, sulfuric acid, and the like, effects hydrolysis of the water glass and the conversion thereof to a silicic acid or a silica sol. The water glass is usually diluted with water and added to the acid in the diluted state, the final pH being at least about 2.5 and not in excess of 4.5. To obviate polymerization and premature gelation thereof, the temperature is maintained below about 100° F.

After a suitable period of time has elapsed during which the reaction mixture is permitted to age at the acidic conditions, preferably under conditions of rapid and continuous stirring, whereby the silica is polymerized to a complex polysilicic acid, the slurry is adjusted to a pH of from about 5 to about 8, preferably a pH of from about 6 to about 7. The reaction mixture is thereafter aged for a time sufficient to develop optimum pore structure of the silica hydrogel, a period of about 0.5 to about 3 hours being suitable, the period of from about 0.5 to 1.5 hours being preferred. The last mentioned aging step is conveniently referred to as basic age in contrast to the first mentioned acid age.

It is understood that the gelation product may be treated with the hereinafter described solution comprising ammonium ions during the acid age step or during the basic age step. In the latter case, the ammonium ion concentration hereinafter prescribed for said solution will be over and above any ammonium ion concentration which may have been employed to adjust the pH of the reaction mixture for said basic age. In the preferred instance, the basic aged gelation product is separated from the reaction mixture and slurried with the aforementioned solution comprising ammonium ions. This last mentioned solution should comprise sufficient ammonium ions to base-exchange at least about 0.5 equivalent of alkali metal cations associated with the crystalline alkali metal aluminosilicate contained in the slurry, any alkali metal associated with the residual portion of the slurry notwithstanding. It is considered essential that the ammonium ion precursor be employed under conditions precluding the formation of acid by-products detrimental to the crystalline aluminosilicate. Thus, ammonium sulfate utilized in excess tends to form the acid salt, ammonium bisulfate and/or the strong acid, sulfuric acid, both of which are detrimental to the crystalline aluminosilicate. Therefore, when the ammonium precursor is an ammonium salt or a strong acid it is preferred to maintain the concentration thereof at a level to furnish ammonium ions sufficient to base-exchange from about 0.1 to about 1.0, and preferably from about 0.3 to about 0.9, equivalents of alkali metal cations associated with the crystalline alkali metal aluminosilicate contained in the slurry. On the other hand, ammonium acetate, being an ammonium salt of a weak acid, can be used in considerable excess without adversely affecting the crystalline aluminosilicate. Suitably, ammonium acetate, or other ammonium salt of a weak acid, is employed in a concentration to furnish ammonium ions sufficient to base-exchange from about 0.3 to about 2.5 equivalents of alkali metal cations associated with said crystalline alkali metal aluminosilicate.

The basic aged gelation product is preferably slurried with the aforesaid solution comprising ammonium ions to a smooth consistency suitable for spray-drying. Thus, the resulting base-exchanged product is suitably and advantageously separated and dried by spray-drying means whereby a rapid evaporation of moisture is effected and dried particles fall out of the spray. The spray-drying step comprises spraying the aqueous slurry in an atomized state into a tower of hot flowing gases. The hot flowing gases are injected into the tower at a temperature to effect a rapid evaporation of moisture so that dried particles of predetermined size range fall out of the spray. The hot flowing gases are suitably injected into the tower at conditions to effect an initial contact with the atomized spray at a temperature of from about 400° F. to about 1200° F. the temperature in the upper range, say from about 650° F. to about 1200° F., being preferred. Hot flue gases have been conveniently and advantageously employed.

After the spray-drying step, the dried material is preferably water-washed to separate water-soluble materials therefrom. The spray-dried material is further treated in contact with a solution comprising ammonium ions, suitably an aqueous ammonium salt solution, such as ammonium sulfate, to remove substantially all of the sodium or other alkali metal, and this last step may be combined with the aforementioned water wash or may be separate and apart therefrom.

The catalyst composite prepared in accordance with the method of this invention can be composited with any of the several catalytically active metallic materials in the oxidized or reduced state.

In one preferred embodiment, the composite, substantially free of alkali metal, is further treated in contact with a solution, preferably an aqueous solution, comprising both rare earth cations and ions selected from the group consisting of hydrogen ions, hydrogen ion precursors, and mixtures thereof. The ratio of hydrogen ions, or ions capable of conversion to hydrogen ions, to rare earth metal ions is not considered critical and may vary over a relatively wide range. A particularly suitable solution is one containing rare earth metal ions and hydrogen ions, or ions capable of conversion to hydrogen ions, in a ratio of from about 10/1 to about 1/1 whereby a base-exchange reaction is effected to yield a composite which comprises aluminum and rare earth metals in a ratio of from about 3/1 to about 6/1. Organic and inorganic acids are generally considered as a convenient source of hydrogen ions. However, it is preferred to utilize a hydrogen ion precursor, particularly an ammonium salt such as ammonium chloride, which is decomposable to provide hydrogen ions at a temperature below the decomposition temperature of the faujasite. Other suitable ammonium salts include ammonium bromide, ammonium iodide, ammonium sulfate, ammonium nitrate, ammonium acetate, ammonium benzoate, ammonium citrate, etc.

The rare earth metals include cerium, lanthanum, praseodynium, neodynium, illinium, samarium, europium, gadolinium, terbium, dysprosium, holmium, erbium, thulium, scandium, yttrium, and lutecium. A wide variety of rare earth compounds can be employed with facility as a source of rare earth metal ions. Suitable soluble compounds include rare earth chlorides, bromides, iodides, sulfates, acetates, benzoates, citrates, nitrates, and the like. The preferred rare earth salts are the chlorides, nitrates and sulfates. The rare earth metal salts employed can either be the salt of a single rare earth metal or, as is usually the case, mixtures of rare earth metals such as rare earth metal chlorides of didymium chlorides. It is contemplated that the product thus treated comprises rare earth cations chemisorbed or ionically bonded to the faujasite, although it may very well be that at least a portion of said cations may be so sorbed or bonded to the amorphous silica component of the catalyst composite. Anions introduced to the composite as a consequence of the base-exchange treatment are suitably separated by water-washing one or more times until free of said ions. The composite is thereafter dried, generally in an air atmosphere, an elevated temperature of from about 150° F. to about 600° F. being suitable. The catalysts thus prepared are particularly effective in the cracking of hydrocarbon feed stocks, such as occur in the gas-oil range of petroleum hydrocarbons, to form lower boiling hydrocarbons in the motor fuel range at catalytic cracking conditions generally described in the art. In particular, a temperature of from about 700° F. to about 1200° F. may be employed and the pressure may range from subatmospheric to several atmospheres. The cracking process can be effected by any of the well-known techniques including a fixed bed type of operation, a moving bed type of operation, and, in particular, the well-known fluidized bed type of operation.

Also of interest are those catalysts comprising one or more metals of Group VI-B and VIII including molybdenum, tungsten, chromium, iron, nickel, cobalt, platinum, palladium, ruthenium, rhodium, osmium and iridium. Thus, the catalyst composite prepared in accordance with the process of this invention can be utilized advantageously as a catalyst, or as a component thereof, to effect a variety of hydrocarbon conversion reactions involving reaction conditions comprising a temperature in the 70–1400° F. range. The catalyst composite of this invention is particularly useful in combination with a hydrogenation component such as nickel together with molybdenum, tungsten, etc., in effecting the hydrocracking of heavy oils, including vacuum residuals, in the presence of hydrogen to form petroleum products in the middle distillate range utilizing a temperature of from about 500 p.s.i.g. to about 2500 p.s.i.g. Said hydrocarbon conversion reactions further include polymerization of olefins, particularly ethylene, propylene, 1-butene, 2-butene, iso-butylene, and also higher boiling olefins, at polymerization reaction conditions. The catalyst composite is also useful as a catalyst or a component thereof in effecting the alkylation of isoparaffins with olefins or other alkylating agents including, for example, alkyl halides and the like; and also for the alkylation of isobutane, isopentane and/or isohexane with ethylene, propylene, 1-butene, etc., or mixtures thereof; and also the alkylation of aromatics with olefins or other alkylating agents, particularly the alkylation of benzene, toluene, etc., with propylene, and higher boiling olefins including nonenes, decenes, undecenes, etc., the foregoing alkylation reactions being effected at alkylation conditions disclosed in the art. The catalyst products of the method of this invention are further helpful in the isomerization of paraffins, particularly n-butene, n-pentane, n-hexane, n-heptane, n-octane, etc., and also the isomerization of less highly branched chain saturated hydrocarbons such as the isomerization of 2- or 3-methylpentane to 2,3- and 2,2-dimethylbutane, isomerization of dimethylcyclohexane to methylcyclohexane, isomerization of methylcyclopentane to cyclohexane, etc., at isomerization reaction conditions. Other hydrocarbon conversion reactions including hydrogen transfer reactions, transalkylation reactions, and the reforming of gasoline or naphtha to improve the anti-knock characteristics thereof, are effectively catalyzed utilizing the catalyst composite prepared in accordance with the method of this invention as a catalyst or component thereof.

The following example is presented in illustration of the method of this invention and is not intended as a limitation on the generally broad scope of the invention as set out in the appended claims.

In the preparation of a faujasite dispersed in its mother liquor, 348.6 grams of sodium aluminate (Nacol #680) was dissolved in a solution of 332 grams of sodium hydroxide in 1340 cubic centimeters of water. The resulting solution was added to a rapidly stirred slurry consisting of 958 grams of silica (Hi-Sil #233) and 2800 cubic centimeters of water. The reaction mixture expressed in terms of oxide mole ratios had a composition as follows:

$Na_2O/SiO_2$ ------------------------------------- 0.4
$SiO_2/Al_2O_3$ ------------------------------------ 10
$H_2O/Na_2O$ ------------------------------------- 40

This reaction mixture was stirred at about room temperature for 6 hours and then further aged without stirring for 16 hours. The reaction mixture was thereafter heated to 198° F. over a period of 8 hours and then heated at 198–212° F. for about 24 hours and then cooled to room temperature. The reaction mixture analyzed 12.6 weight percent faujasite.

An acidic sodium silicate solution was prepared by the addition of about 22 liters of a water glass solution (6.9% $SiO_2$) to about 3.0 liters of 25% sulfuric acid, the pH attaining 3.5. The resulting solution was stirred vigorously and 1570 grams of the faujasite-mother liquor added thereto together with about 470 ml. of 25% sulfuric acid to maintain a pH of 3.5–4.0. The pH was adjusted to 4.2 by the further addition of water glass solution. Within about 15 minutes the mixture started to gel and stirring was continued for an additional 15 minutes. Thereafter, the pH of the mixture was adjusted to 5.5 by the further addition of water glass and aged for about 1 hour. The total amount of said water glass solution employed was 22.18 liters. The aged product was then filtered and reslurried in water to a volume of 23 liters and spray dried. The spray-dried product was further treated as hereinafter described to form a catalyst designated as "Catalyst A."

A second catalyst designated as "Catalyst B" was prepared in substantially the same manner as hereinabove described with the exception that said aged product was filtered and reslurried in water containing 100 grams of ammonium acetate to a volume of 23 liters and spray dried. The spray-dried product was further treated as hereinafter described to yield the product designated as "Catalyst B."

A third catalyst designated as "Catalyst C" was prepared substantially as described with the exception that said aged product was filtered and reslurried in water containing 29 grams of ammonium sulfate to a volume of 23 liters and spray-dried. The spray-dried product was further treated as hereinafter described to yield the product designated as "Catalyst C."

The spray-dried products were each washed with a dilute aqueous ammonium chloride solution and base-exchanged with a solution comprising ammonium chloride and mixed rare earth chlorides (57.92% rare earth chloride hexahydrate). The base-exchange was accomplished over a 2 hour period whereby the catalyst contained about 1.0 weight percent rare earth metals. The catalysts were thereafter water washed substantially free of soluble matter and dried at 400° F.

The catalysts thus prepared were steam deactivated in preparation for testing, as hereinafter described, by passing 60% steam in air in contact with the catalyst at a temperature of 1400° F. for a period of 12 hours. The test consisted of passing a gas oil boiling in the 530–995° F. range in contact with the catalyst at substantially atmospheric pressure at a feed rate of 4 weight hourly space velocity. The tests were run at a temperature of 900° F. Each test consisted of 5 cycles and each cycle consisted of a processing period, a stream stripping period and an air regeneration period. The tests results are tabulated at the conclusion hereof.

Of the commercial cracking catalysts comprising a faujasite distributed in an amorphous silica-alumina matrix and containing rare earth metals, two were selected for comparative testing with respect to the catalysts prepared by the method of this invention. Selection was on the basis of improved cracking properties with respect to other commercially available cracking catalysts. The catalysts were evaluated by the above described method. The exact composition of the catalysts, designated as "Catalyst X" and "Catalyst Y" has not been disclosed.

| Catalyst | A | B | C | X | Y |
|---|---|---|---|---|---|
| Conversion, volume percent | 50.3 | 56.3 | 59.5 | 56.7 | 58.8 |
| Gasoline, weight percent | 33.2 | 42.7 | 40.2 | 35.8 | 36.4 |
| Coke, weight percent | 4.7 | 4.7 | 4.4 | 6.0 | 7.5 |

The art discloses a number of methods for preparing a crystalline aluminosilicate dispersed in an amorphous inorganic oxide matrix virtually all of which require separation of the crystalline aluminosilicate from its mother liquor prior to dispersion thereof in said amorphous matrix. For example, it is the conventional practice to prepare the crystalline aluminosilicate by the method whereby an appropriate mixture of oxides or materials whose composition can be completely represented as a mixture of the oxides $SiO_2$, $Al_2O_3$, $Na_2O$ and $H_2O$, is heated together in an aqueous solution with the formation of the desired crystalline aluminosilicate. The nature of the reaction necessitates a substantial excess of $SiO_2$ in the reaction mixture over that which appears in the reaction products. Preliminary to dispersing the crystalline aluminosilicate in the amorphous matrix it has been considered essential that said aluminosilicate be first separated from its mother liquor and water-washed until the water in equilibrium with the product is substantially free of soluble salts and amorphous silica. By the method of this invention, the $SiO_2$ raw material is fully utilized and the various intermediate steps, e.g., filtration, washing, drying and final reslurrying of the crystalline aluminosilicate are conveniently and advantageously obviated. More important, the catalyst prepared in accordance with the method of this invention is an improved catalyst, particularly with respect to the catalytic cracking of hydrocarbon charge stocks.

I claim as my invention:

1. A catalyst composite comprising a crystalline aluminosilicate dispersed in a silica matrix prepared by the method comprising;
    (a) dispersing a crystalline alkali metal aluminosilicate-mother liquor mixture in an acidifiied alkali metal silicate solution having a pH in excess of about 2.5, controlling the pH of the reaction mixture while effecting said dispersing so as not to exceed about 4.5, the final pH being from about 3.5 to about 4.5, and effecting gelation,
    (b) slurrying the resulting gelation product with a solution comprising ammonium ions sufficient to base-exchange at least about 0.1 equivalent of alkali metal cations associated with said crystalline alkali metal aluminosilicate, the concentration of the ammonium ion precursor being such as to preclude the formation of acidic by-products selected from the group consisting of strong mineral acids and acid salts thereof,
    (c) separating and drying the resulting base-exchanged product.

2. The catalyst composite of claim 1 further characterized with respect to step (a) in that the reaction mixture comprising the gelation product is adjusted to a pH of from about 5 to about 8 and aged at said pH for a period of at least about 0.5 hour.

3. The catalyst composite of claim 2 further characterized with respect to step (b) in that said gelation product is separated from said reaction mixture prior to slurrying said product with said solution comprising ammonium ions.

4. The catalyst composite of claim 3 further characterized with respect to step (c) in that said base-exchanged product is separated and dried by spray-drying means whereby a rapid evaporation of moisture is effected and dried particles fall out of the spray.

5. The catalyst composite of claim 4 further characterized with respect to step (c) in that the base-exchanged product thus separated and dried is further treated in contact with a solution comprising ammonium ions whereby the total alkali metal content is reduced to less than about 1 weight percent thereof.

6. The catalyst composite of claim 5 further characterized with respect to step (a) in that said crystalline alkali metal aluminosilicate is a crystalline sodium aluminosilicate prepared dispersed in its mother liquor by crystallization from an aqueous sodium aluminosilicate reaction mixture having a composition expressed in terms of oxide mole ratios in the following range:

$Na_2O/SiO_2$ ------ 0.3 to 0.7
$SiO_2/Al_2O_3$ ------ 6 to 20
$H_2O/Na_2O$ ------ 25 to 60

7. The catalyst composite of claim 6 further characterized with respect to step (a) in that said crystalline aluminosilicate-mother liquor mixture is dispersed in an acidified sodium silicate solution having a pH in excess of about 2.5 and less than about 4.5.

8. The catalyst composite of claim 6 further characterized with respect to step (a) in that said gelation is effected at a temperature of from about 70° F. to about 110° F.

9. The catalyst composite of claim 6 further characterized with respect to step (a) in that said reaction mixture comprising said gelation product is adjusted to a pH of from about 6 to about 7 and aged at said pH for a period of from about 0.5 to about 1.5 hours.

10. The catalyst composite of claim 9 further characterized with respect to step (b) in that said aged material is slurried with an ammonium sulfate solution comprising ammonium ions sufficient to base-exchange from about 0.3 to about 0.9 equivalent of sodium cations associated with said crystalline sodium aluminosilicate.

11. The catalyst composite of claim 9 further characterized with respect to step (b) in that said aged material is slurried with an ammonium acetate solution comprising ammonium ions sufficient to base-exchange from about 0.3 to about 2.5 equivalents of sodium cations associated with said crystalline sodium aluminosilicate.

12. The catalyst composite of claim 10 further characterized with respect to step (c) in that said base-exchanged product is spray-dried at an inlet temperature of from about 650° F. to about 1200° F.

13. The catalyst composite of claim 11 further characterized with respect to step (c) in that said base exchanged product is spray-dried at an inlet temperature of from about 650° F. to about 1200° F.

14. The catalyst composite of claim 12 further characterized with respect to step (c) in that said total sodium content is reduced to less than about 0.2 weight percent.

15. The catalyst composite of claim 13 further characterized with respect to step (c) in that said total sodium content is reduced to less than about 0.2 weight percent.

16. The catalyst composite of claim 12 further characterized with respect to step (c) in that the substantially sodium-free material is base-exchanged in contact with a solution comprising rare earth metal cations whereby the final catalyst composite comprises aluminum and rare earth metals in a ratio of from about 3:1 to about 6:1.

17. The catalyst composite of claim 13 further characterized with respect to step (c) in that the substantially sodium-free material is base-exchanged in contact with a solution comprising rare earth metal cations whereby the final catalyst composite comprises aluminum and rare earth metals in a ratio of from about 3:1 to about 6:1.

18. A process for cracking a hydrocarbon charge stock which comprises contacting said charge stock with the catalyst of claim 1 at cracking conditions.

19. A process for cracking a hydrocarbon charge stock which comprises contacting said charge stock with a catalyst of claim 17 at cracking conditions.

References Cited

UNITED STATES PATENTS

| | | | |
|---|---|---|---|
| 3,140,253 | 7/1964 | Plank et al. | 208—120 |
| 3,329,628 | 7/1967 | Gladrow et al. | 252—455 X |
| 3,344,086 | 9/1967 | Cramer et al. | 252—451 X |
| 3,352,796 | 11/1967 | Kimberlin et al. | 252—455 |

DANIEL E. WYMAN, Primary Examiner

C. F. DEES, Assistant Examiner

U.S. Cl. X.R.

252—451, 455